United States Patent
Sakamoto et al.

(10) Patent No.: US 9,053,225 B2
(45) Date of Patent: Jun. 9, 2015

(54) DATA PROCESSING APPARATUS, DATA PROCESSING METHOD, AND STORAGE MEDIUM

(75) Inventors: Isao Sakamoto, Kawasaki (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 13/114,155

(22) Filed: May 24, 2011

(65) Prior Publication Data

US 2011/0320677 A1  Dec. 29, 2011

(30) Foreign Application Priority Data

Jun. 28, 2010 (JP) ................. 2010-146889

(51) Int. Cl.
*H04L 12/26* (2006.01)
*G06F 13/36* (2006.01)
*G06F 15/173* (2006.01)

(52) U.S. Cl.
CPC .............. *G06F 13/36* (2013.01); *G06F 15/173* (2013.01)

(58) Field of Classification Search
USPC ................... 370/254, 258, 400, 403
See application file for complete search history.

(56) References Cited

U.S. PATENT DOCUMENTS

| | | | | |
|---|---|---|---|---|
| 6,091,705 A * | 7/2000 | Regula | ............... | 370/223 |
| 6,292,200 B1 * | 9/2001 | Bowen et al. | ............... | 345/506 |
| 7,379,067 B2 * | 5/2008 | Deering et al. | ............... | 345/506 |
| 2009/0168671 A1 * | 7/2009 | Holness et al. | ............... | 370/256 |
| 2010/0293310 A1 | 11/2010 | Kimura et al. | ............... | 710/105 |
| 2010/0329267 A1 | 12/2010 | Sakamoto et al. | ............... | 370/400 |
| 2011/0149974 A1 | 6/2011 | Sakamoto et al. | ............... | 370/394 |

FOREIGN PATENT DOCUMENTS

| | | |
|---|---|---|
| EP | 0921474 | 6/1999 |
| JP | 09-091262 | 4/1997 |
| JP | 11-167560 | 6/1999 |
| JP | 4359490 | 11/2009 |
| JP | 2011-8541 A | 1/2011 |

* cited by examiner

*Primary Examiner* — Wei Zhao
*Assistant Examiner* — Robert M Morlan
(74) *Attorney, Agent, or Firm* — Fitzpatrick, Cella, Harper & Scinto

(57) ABSTRACT

A data processing apparatus comprising: a determination unit to determine whether data input from input/output module is data to be processed by a plurality of processing modules in a setting order; and a switching unit to switch a first data and second data processing path, so that when the determination unit determines that the data input from the input/output module is not data to be processed by the processing modules in the setting order, the communication modules circulate data via the first data processing path used to transfer the data in an order in which the communication modules are connected, and otherwise, the communication modules circulate data via the second data processing path used to control the communication modules to transfer the data in the setting order.

21 Claims, 13 Drawing Sheets

F I G. 4A
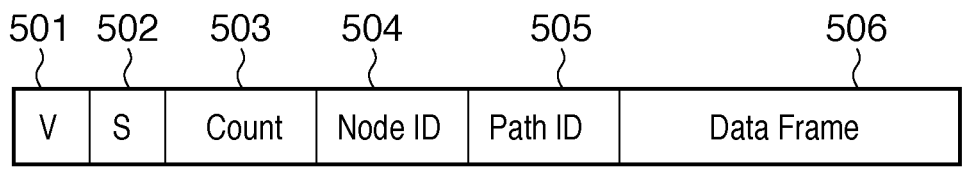
F I G. 4B
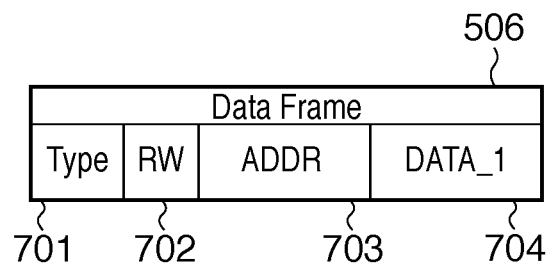
F I G. 4C
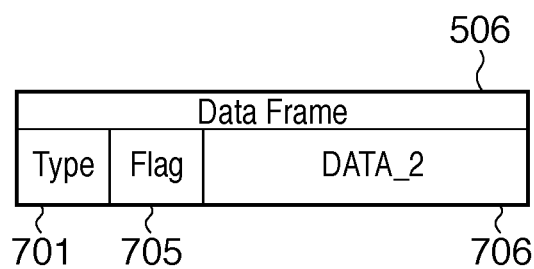

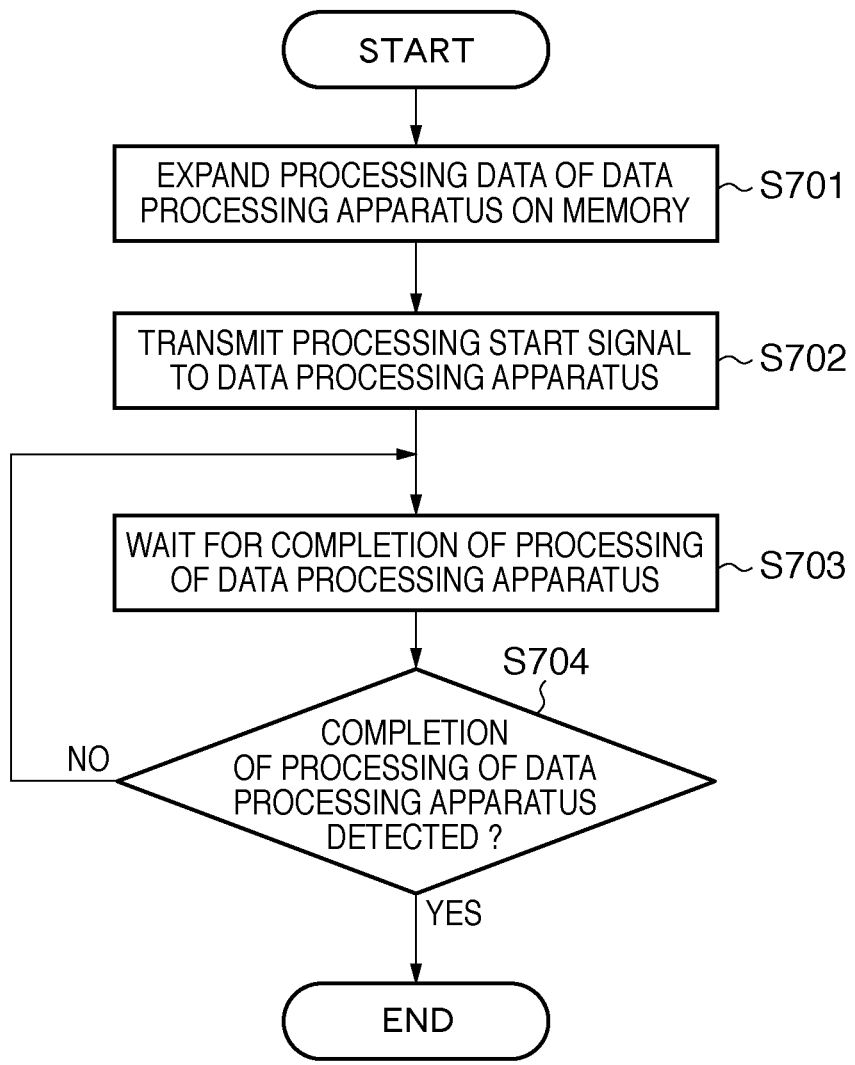

DATA PROCESSING APPARATUS, DATA PROCESSING METHOD, AND STORAGE MEDIUM

BACKGROUND OF THE INVENTION

1. Field of the Invention

The present invention relates to a data processing apparatus, data processing method, and storage medium, which execute data transfer according to data types in a ring-shaped data transfer channel, which connects a plurality of modules.

2. Description of the Related Art

Conventionally, a data processing apparatus which executes data processing using a plurality of modules connected to a ring-shaped data transfer channel has been proposed (for example, see Japanese Patent Laid-Open No. 11-167560 or 9-091262). In the ring-shaped data transfer channel, each individual module includes a memory used to temporarily store received data. Hence, the data transfer channel can be divided into independent partial transfer channels, and data can be independently transferred between modules. Thus, data that is as many as the number of modules is parallelly transferred, thus enhancing data transfer efficiency.

In Japanese Patent Laid-Open No. 11-167560, data to be transferred has destination information indicating a destination module so as to implement data transfer between modules. In Japanese Patent Laid-Open No. 9-091262, a module ID is changed using an ID register and an ID setting flag, which are used to set an ID for each module, without requiring any dedicated operation circuit and signal lines.

Furthermore, a method of transferring data using a transmission channel which connects modules in series so as to configure functions of a plurality modules has been proposed (for example, see Japanese Patent No. 4359490).

When transfer data (packet) has destination information as in Japanese Patent Laid-Open No. 11-167560, packets have to be generated in correspondence with destinations so as to branch a data path, and generation and transmission of packets as many as the number of branches may lower a processing throughput.

When an ID is set to change a data path under the condition that an ID setting flag of each module is reset as in Japanese Patent Laid-Open No. 9-091262, only a specific data path cannot be switched.

In Japanese Patent No. 4359490, processing elements (corresponding to processing units of modules in the present invention) connected in series are used as a data transfer channel of a memory required to switch configuration information of the processing elements. Then, a data transfer channel to be processed is independently arranged. When there are a plurality of data transfer channels between modules, it is difficult to switch the configurations of modules that is synchronized with processing data, or a synchronization mechanism for that purpose is required.

When a data flow includes branches, and when a value of a register or memory in a module located on a branch destination path is read, a packet transferred in a certain path after the branch can acquire a correct value since a module is connected. However, a packet transferred in another path cannot acquire a correct value. Furthermore, when branched paths are merged again, one of these paths has to be determined. In this case, a packet that acquired a correct value has to be distinguished. Of course, when a register in a module after the paths are merged is a read target, neither packets may hold a correct value. In order to attain this determination, all modules which may serve as merging points of paths are required to have a determination function. Hence, a circuit scale as a whole inevitably increases in correspondence with the determination functions as many as the number of modules. If there is no merging point after a branch, two output destinations from an input/output unit are required. In this case, memory areas as many as the number of branched output destinations are required. Also, memory areas which store correct output results are different depending on paths to which modules belong. For this reason, when a CPU wants to acquire a register read result, it has to search for a memory area which stores a correct result based on a path to which a target module belongs.

Data to be processed has to be transferred between modules in a predetermined order, and a data path used to transfer data may go round on a ring bus or may be branched. Data used to read or write a value of a register or memory need only be transferred to a target module. When the data path includes a round path or branches, data may make an extra round or may be transferred to a branch destination of an unnecessary path, resulting in low processing efficiency.

The present invention provides, in consideration of at least one of the aforementioned problems, a technique which enhances processing efficiency by switching data paths according to data types to be transferred to modules.

SUMMARY OF THE INVENTION

According to one aspect of the present invention, there is provided a data processing apparatus, which circulates data in one direction between a plurality of communication modules connected in a ring shape, the apparatus comprising: at least one input/output module adapted to be connected to at least one of the plurality of communication modules, and input/output data to/from the connected communication module; a plurality of processing modules adapted to be respectively connected to a plurality of communication modules other than the communication module connected to the input/output module, process data input from the connected communication modules, and output the processed data to the connected communication modules; a determination unit adapted to determine whether or not data input from the input/output module is data to be processed by the plurality of processing modules in a setting order set by a setting unit; and a switching unit adapted to switch a first data processing path and a second data processing path, so that when the determination unit determines that the data input from the input/output module is not data to be processed by the plurality of processing modules in the setting order, the plurality of communication modules circulate data via the first data processing path used to transfer the data in an order in which the plurality of communication modules are physically connected, and when the determination unit determines that the data input from the input/output module is data to be processed by the plurality of processing modules in the setting order, the plurality of communication modules circulate data via the second data processing path used to control the plurality of communication modules to transfer the data in the setting order.

Further features of the present invention will be apparent from the following description of exemplary embodiments with reference to the attached drawings.

BRIEF DESCRIPTION OF THE DRAWINGS

FIG. 4A is a view showing an example of the configuration of a packet which flows on a ring-shaped data transfer channel;

FIG. 4B is a view showing an example of the internal format of data 506;

FIG. 4C is a view showing another example of the internal format of the data 506;

FIG. 7 is a flowchart showing the control processing sequence of setting/execution processing;

DESCRIPTION OF THE EMBODIMENTS

Figure 1A:
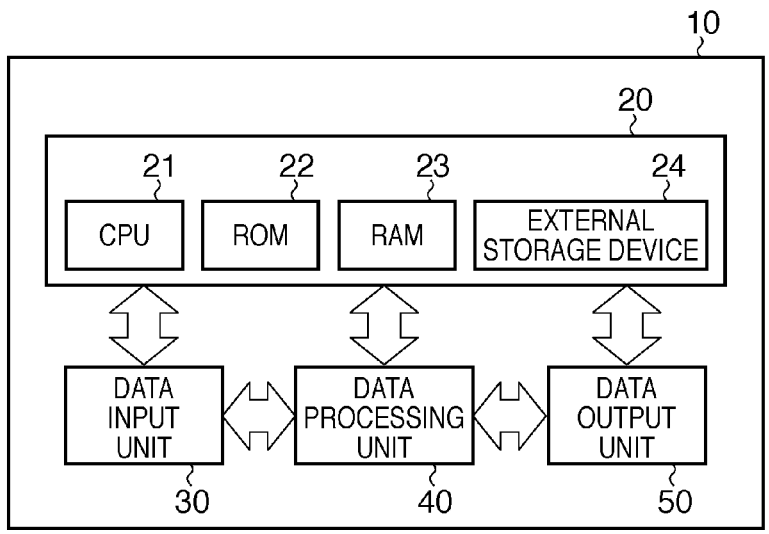
FIG. 1A is a block diagram showing the hardware arrangement of a data processing apparatus 10.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Desired data processing in a data processing apparatus according to the present invention is implemented by configuring a logical data transfer channel (data path) between communication modules, and transferring data to be processed by processing units via the data path. The data path can be configured on a ring bus independently of a physical connection order of modules, since each reception unit extracts data to be processed by a self module from a packet. That is, the data path makes rounds on the ring bus. By setting to allow a plurality of reception units to extract data, the data path can be branched. Also, by allowing the reception units to extract data of a packet generated by a plurality of communication modules (to be also referred to as "communication units" hereinafter), data paths can be integrated.

Data which is transferred to go round on the ring bus includes three types: (1) data to be processed by a processing unit; (2) data used to read or write a value of a register or memory of a processing unit; and (3) data used to set a data transfer channel in a communication unit. By transferring all these three types of data on the single ring bus, a simple configuration and an operation synchronized with processing data can be realized.

The hardware arrangement of a data processing apparatus 10 according to the present invention will be described first with reference to FIG. 1A.

The data processing apparatus 10 includes a system control unit 20, data input unit 30, data processing unit 40, and data output unit 50. The system control unit 20 includes a CPU 21, ROM 22, RAM 23, and external storage device 24.

The CPU 21 executes various kinds of operation control. The ROM 22 stores permanent data and programs. The RAM 23 is used to temporarily save data, and to load programs. The RAM 23 may include many kinds of RAMs such as an SRAM and DRAM, or may include a plurality of RAMs. Some of these RAMs may function inside the CPU 21. The external storage device 24 holds external data.

The data input unit 30 fetches data to be processed from outside a system. For example, the data input unit 30 is an image reading device having devices such as an image scanner and A/D converter, or an audio input device having devices such as a microphone and A/D converter.

The data processing unit 40 is set with various data processing contents under the control of the system control unit 20. The data processing unit 40 executes processing for supplied processing data according to the set processing contents, and outputs processed data. The data processing unit 40 receives and processes input data input to the data input unit 30. Also, the data processing unit 40 may process data supplied from the system control unit 20 according to an instruction from the system control unit 20. A processing result of the data processing unit 40 may be sent to the system control unit 20 again or may be sent to the data output unit 50 directly.

The data output unit 50 externally outputs data processed by the data processing unit 40. For example, the data output unit 50 is an image output device including a printer device which converts image data into a print dot pattern and outputs that pattern, or an audio output device which outputs audio data via a D/A converter. Data input to the data input unit 30 may be sent to the system control unit 20 and may be processed by the CPU 21, or may be temporarily recorded in the RAM 23 or external storage device 24.

A schematic arrangement of the data processing apparatus 10 according to the first embodiment will be described below with reference to FIG. 1B. A data input/output unit 101 as an input/output module externally inputs data to be processed, and externally outputs processed data. Of communication units 102-1 to 102-m (to be referred to as communication units 102 hereinafter), the communication units 102-2 to 102-m are respectively connected to data processing units 103-2 to 103-m (to be referred to as data processing units 103) as processing modules to form pairs. Arrows indicate directions to flow data (or packets). As shown in FIG. 1B, each of modules 100-1 to 100-m, which are connected in a ring shape, receives data from one module, and transmits data to the other module.

Each of the communication units 102-1 to 102-m is connected to the neighboring communication units (note that the communication unit 102-m is connected to the communication unit 102-1) to configure a ring-shaped data transfer channel (to be also referred to as a ring bus 104 hereinafter). That is, the communication units 102-1 to 102-m configure the ring bus 104, and exchange data between the ring bus 104 and the data input/output unit 101 or the processing units 103. For this purpose, the communication units 102-2 to 102-*m* are connected to the data processing units 103-2 to 103-*m*. That is, the input/output module is connected to at least one of the plurality of communication modules, and inputs/outputs data from/to the connected communication module. The processing modules are respectively connected to a plurality of communication modules other than the communication module connected to the input/output module. Each processing module processes data input from the connected communication module, and outputs processed data to the connected communication module.

More specifically, data input from an input terminal 151 is input to the communication unit 102-1 via the data input/output unit 101. The input data is packetized, and is flowed onto the ring bus 104. Each communication unit 102 fetches a required packet from the ring bus 104 according to information set in advance, extracts data from the fetched packet, and inputs the data to the data processing unit 103. The data processing unit 103 executes predetermined data processing (for example, color space conversion processing, resolution conversion processing, etc.), and outputs processed data to the communication unit 102.

The processed data is packetized by the communication unit 102, and is flowed onto the ring bus. In this manner, data is processed in turn by the data processing units 103-2 to 103-*m* in an order, which is set in advance by the communication units 102-2 to 102-*m*. Data which has undergone desired data processing implemented by the packet transfer in the set order is fetched by the data input/output unit 101 via the communication unit 102-1, and is externally output from an output terminal 152. Note that the data input/output unit 101 interfaces with an external device (or module), and may be omitted when the communication unit 102-1 can directly interface with the external device (or module).

<Arrangement of Communication Unit 102>

Figure 2:
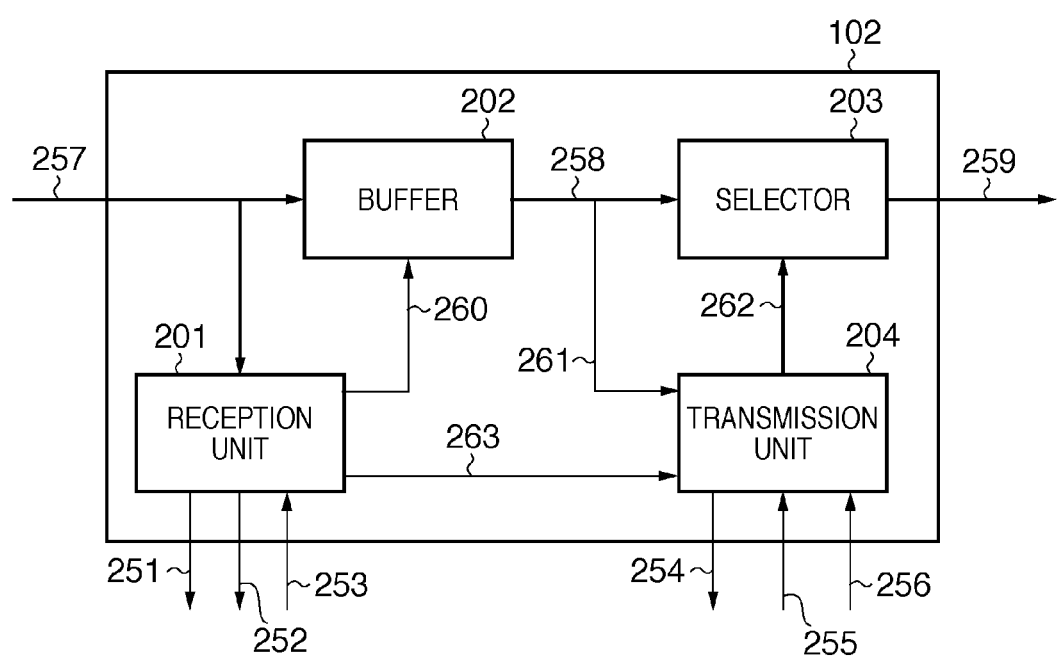
FIG. 2 is a schematic block diagram showing the arrangement of a communication unit 102.

A schematic arrangement of the communication unit 102 will be described below with reference to FIG. 2. The communication unit 102 includes a data reception unit 201, buffer 202, selector 203, and data transmission unit 204.

By connecting output terminals 259 and input terminals 257 of the neighboring communication units 102, a ring-shaped data transfer channel is configured by the communication units 102-1 to 102-*m*. To signal lines 251 to 256, the data processing unit 103 is connected.

Prior to a detailed description of FIG. 2, an example of the configuration of a packet which flows on the ring-shaped data transfer channel will be described below with reference to FIG. 4A. A field 501 stores a valid flag indicating that a packet is valid. A field 502 stores a stall flag indicating that a packet is reception-stalled. A field 503 stores a count value indicating a transmission order of data. A field 504 stores a connection ID used to identify a logical connection of data. A field 505 stores a path identifier used to identify a data path on which data is transferred. A field 506 stores data to be processed. In FIG. 2, a packet input from the neighboring communication unit 102 is temporarily held by the buffer 202, and is output to the selector 203 in the next clock cycle. The data reception unit 201 monitors a packet at the input terminal 257. When all conditions (1) to (3) below are satisfied, the data reception unit 201 fetches the packet, and outputs data from an output terminal 252 to the data processing unit 103 (by enabling a valid signal 251).

(1) The valid flag 501 of the packet is valid.
(2) The connection ID 504 and count value 503 match values held by the data reception unit 201.
(3) It is possible to input data to the connected data processing unit 103 (when a stall signal 253 is invalid, that is, it indicates a receivable state).

The data reception unit 201 notifies the buffer 202 of fetching of data via a signal line 260, and invalidates the packet by clearing the valid flag 501 of the packet stored in the buffer 202. After the packet is fetched, the count value 503 held by the data reception unit 201 is incremented.

On the other hand, when all conditions (1) to (3) below are satisfied, the data reception unit 201 notifies the buffer 202 of stalling of data via the signal line 260, and sets the stall flag 502 of the packet stored in the buffer 202.
(1) The valid flag 501 of the packet is valid.
(2) The connection ID 504 and count value 503 match values held by the data reception unit 201.
(3) It is impossible to input data to the connected data processing unit 103 (when the stall signal 253 is valid, that is, it indicates an unreceivable state).

Even when the valid flag 501 of the input packet is valid, and the connection ID 504 matches a value held by the data reception unit 201, when the count value 503 does not match a value held by the data reception unit 201, data cannot be fetched. Hence, in this case as well, the stall flag 502 is set. Note that the count value need not be evaluated depending on processing contents in judgment as to whether or not to receive a packet, as will be described later in an operation example.

The data transmission unit 204 monitors the valid flag 501 of an output packet (signal line 258) in the buffer 202. When the valid flag 501 is valid, since data cannot be output onto the ring bus, the data transmission unit 204 sets a stall signal 254 to stall a data output from the connected data processing unit 103. On the other hand, when the valid flag 501 is invalid, since data can be output onto the ring bus, the data transmission unit 204 resets the stall signal 254.

When both conditions (1) and (2) below are satisfied, the data transmission unit 204 generates a packet by validating the valid flag 501, invalidating the stall flag 502, and appending the count value 503 and the connection ID set in a register.
(1) It is possible to output data from the connected data processing unit 103 (when a valid signal 256 is valid).
(2) The valid flag 501 of the output packet in the buffer 202 is invalid.

Then, the data transmission unit 204 controls the selector 203 to flow the generated packet from the output terminal 259 onto the ring bus. After the packet is output, the count value 503 held by the data transmission unit 204 is incremented. Note that the count value need not be incremented in a configuration that does not evaluate any count value, as will be described later in an operation example.

An overview of an operation of the data processing apparatus 10 according to the first embodiment will be described below. The plurality of data processing units 103, which execute predetermined data processing, and the data input/output unit 101 are connected in a ring shape in a predetermined order respectively via the corresponding communication units 102. Each communication unit 102 includes the data reception unit 201 which receives data from the previous communication unit 102, and the data transmission unit 204 which transmits data to the next communication unit 102.

To each of the data reception unit 201 and data transmission unit 204, connection ID information used to identify a logical order of data processing is assigned. This logical order is an arbitrarily set setting order. When the communication unit 102 receives a packet having the same ID information as the connection ID information (reception ID number) assigned to the data reception unit 201, it controls the corresponding data processing unit 103 to apply data processing to this packet. Then, the communication unit 102 sets connection ID information (transmission ID number) assigned to the data transmission unit 204 to this packet that has undergone the data processing, and transmits the packet to the next communication unit 102. On the other hand, when the communication unit 102 receives a packet having an ID which is not the same as the connection ID information assigned to the data reception unit 201, it transmits that packet to the next communication unit 102 without changing ID information.

In this way, by controlling a packet transmission channel by assigning connection ID information to the data reception unit 201 and data transmission unit 204, data processing having a complicated data path can be efficiently attained.

Note that a packet is kept transferred in one direction on the ring bus in practice, but data stored in the packet can be processed by a plurality of modules via a desired data path by the aforementioned method.

<Arrangement of Data Reception Unit 201>

Figure 3A:
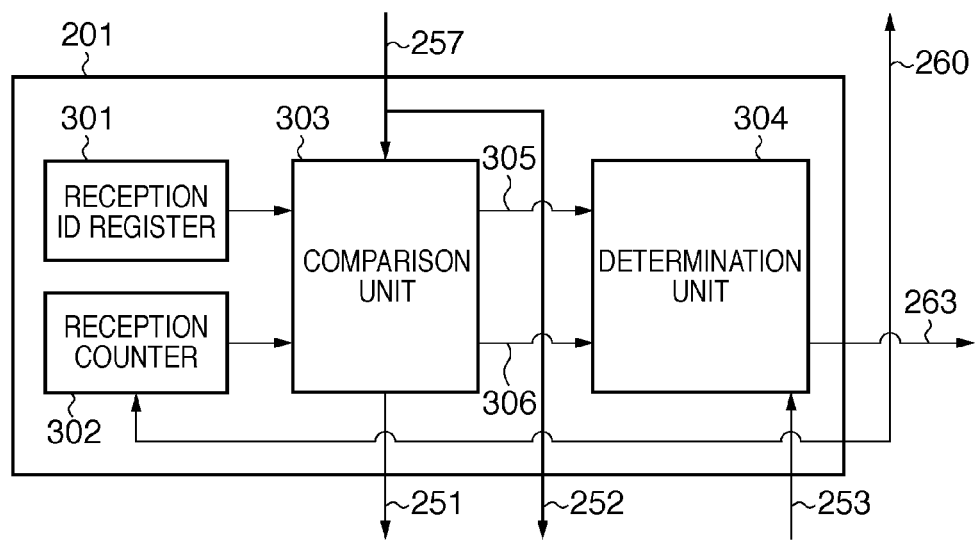
FIG. 3A is a schematic block diagram showing the arrangement of a data reception unit 201.

A schematic arrangement of the data reception unit 201 will be described below with reference to FIG. 3A. The data reception unit 201 includes a reception ID register 301, reception counter 302, comparison unit 303, and determination unit 304.

The comparison unit 303 monitors the valid flag 501, connection ID 504, and count value 503 of a packet on the ring bus, which is input from the input terminal 257. When all conditions (1) to (3) below are satisfied, the comparison unit 303 validates the valid signal 251.
(1) The valid flag 501 of a packet is valid.
(2) The connection ID 504 of the packet matches that stored in the reception ID register 301.
(3) The count value 503 of the packet matches a value of the reception counter 302.

Note that a data part of this packet is output from the output terminal 252. Also, the comparison unit 303 outputs a count value matching signal 305 and data processing completion detection signal 306 to the determination unit 304.

The comparison unit 303 compares whether or not the connection ID 504 of a packet, the valid flag 501 of which is valid, matches that stored in the reception ID register 301. If the two IDs match, the comparison unit 303 outputs a signal (ID matching signal) indicating that the two IDs match. Furthermore, when the count value 503 of this packet matches the value of the reception counter 302, the comparison unit 303 outputs a signal indicating that the two values match as the count value matching signal 305.

The comparison unit 303 outputs the ID matching signal and count value matching signal 305 to the determination unit 304. Note that when the comparison unit 303 is controlled to output the count value matching signal 305 only when the output condition of the ID matching signal is satisfied, a packet determination signal need not be output to the determination unit 304. The data processing completion detection signal 306 indicates reception of data which is output after completion of a series of data processes.

The determination unit 304 determines based on the ID matching signal, count value matching signal 305, and stall signal 253 from the connected data processing unit 103 whether or not that data processing unit 103 can fetch data. When it is determined that the data processing unit 103 can fetch data, the data reception unit 201 notifies the buffer 202 of fetching of data as a data fetching notification signal via the signal line 260. Then, the data reception unit 201 clears the valid flag 501 of the packet stored in the buffer 202 to invalidate the packet. Note that to branch data (to use data in a plurality of data processing units), this packet invalidating processing can be turned on/off by, for example, the CPU. The data fetching notification signal is also input to the reception counter 302. When it is determined that data can be fetched, the count value of the reception counter 302 is incremented (+1) in the next clock cycle so as to acquire next data.

On the other hand, when it is determined based on the ID matching signal, count value matching signal 305, and stall signal 253 from the connected data processing unit 103 that data to be fetched by that data processing unit 103 cannot be fetched, reception of the data is stalled. More specifically, the data reception unit 201 notifies the buffer 202 of stalling of data via the signal line 260, and sets the stall flag 502 of the packet stored in the buffer 202. When it is determined based on the ID matching signal and count value matching signal 305 that a packet is that to be fetched but the data fetching order does not match, the data reception unit 201 executes the same stalling processing.

Furthermore, the determination unit 304 determines based on the data processing completion detection signal 306 and the stall signal 253 from the connected data processing unit 103 whether or not a series of data processes are complete. Then, the determination unit 304 outputs a determination result onto a signal line 263.

<Arrangement of Data Transmission Unit 204>

Figure 3B:
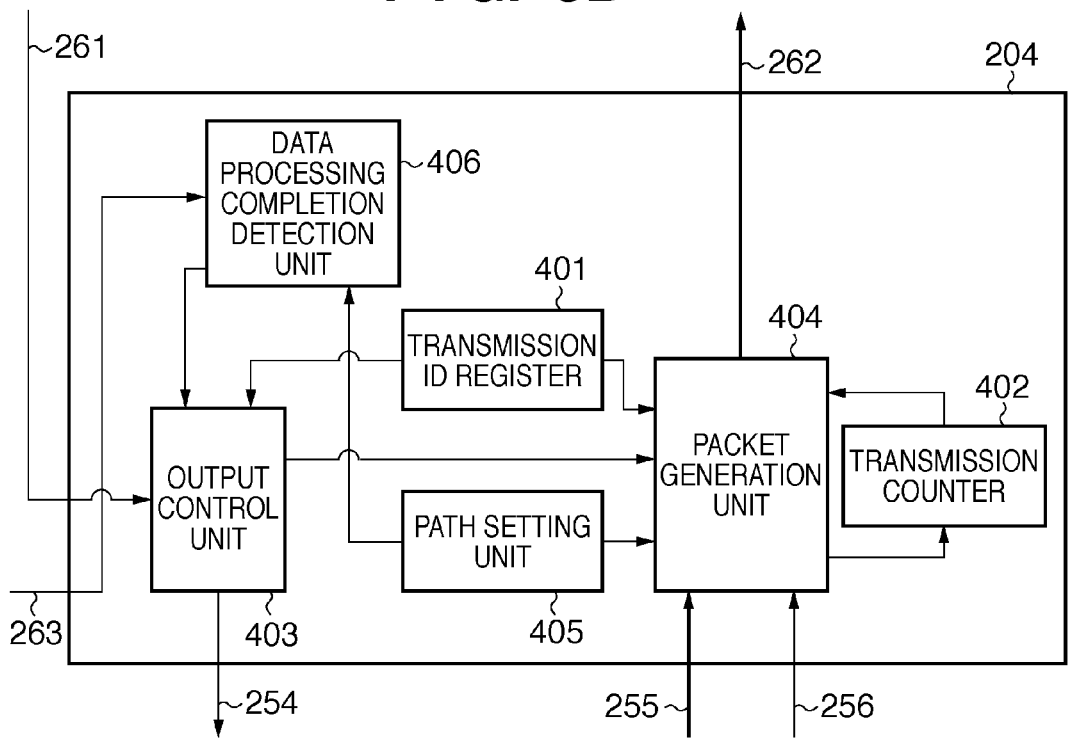
FIG. 3B is a schematic block diagram showing the arrangement of a data transmission unit 204.

A schematic arrangement of the data transmission unit 204 will be described below with reference to FIG. 3B. The data transmission unit 204 includes a transmission ID register 401, transmission counter 402, output control unit 403, packet generation unit 404, path setting unit 405, and data processing completion detection unit 406.

The output control unit 403 monitors the valid flag 501, stall flag 502, and connection ID 504 of an output packet (signal line 258) from the buffer 202. When the valid flag 501 is valid, since data cannot be output onto the ring bus, the output control unit 403 sets the stall signal 254 to stall a data output of the paired data processing unit 103. On the other hand, when the valid flag 501 is invalid, the output control unit 403 resets the stall signal 254.

When both conditions (1) and (2) below are satisfied, the output control unit 403 determines that a packet output by itself is returned while going round the ring bus without being stalled by any other modules. Then, the output control unit 403 controls the selector 203 via the packet generation unit 404 to invalidate the packet by invalidating the valid flag 501. In this case, since a packet of the data processing unit 103 can be output, the output control unit 403 resets the stall signal 254. Note that the output control unit 403 also sets the stall signal 254 when a data path is switched, as will be described later.
(1) The valid flag 501 of an output packet from the buffer 202 is valid, and the stall flag 502 does not indicate stalling.
(2) The connection ID 504 of the output packet from the buffer 202 matches that stored in the transmission ID register 401.

The packet generation unit 404 refers to the valid signal 256 of the connected data processing unit 103. Then, the packet generation unit 404 determines whether or not data can be output from the data processing unit 103. When it is determined that data can be output from the data processing unit 103 (when the valid signal 256 is valid), and when an output packet from the buffer 202 satisfies one of conditions (1) and (2) below, the packet generation unit 404 validates the valid flag 501, and invalidates the stall flag 502. Then, the packet generation unit 404 generates a packet by appending the count value of the transmission counter 402, the connection ID set in the transmission ID register 401, and a path identifier of the path setting unit 405. When the data transmission unit 204 controls the selector 203, the generated packet is flowed onto the ring bus from the output terminal 259. Then, the count value of the transmission counter 402 is incremented (+1) in the next clock cycle. The transmission counter 402 of the data transmission unit 204 and the reception unit 302 of the data reception unit 201 which receives a packet from this data transmission unit 204 are initialized to the same value before the beginning of data transfer, so as to be synchronized with each other.

(1) The valid flag 501 of that output packet is invalid.
(2) That packet is a packet to be invalidated after extraction of data (a packet in which the valid flag 501 is valid and the stall flag 502 does not indicate stalling, and the connection ID 504 of which matches that stored in the transmission ID register 401).

<Setting of Data Path>

An example of the internal format of the data 506 in a packet which is transferred when a value is changed by accessing a register of a module such as the path setting unit 405 shown in FIG. 3B will be described below with reference to FIG. 4B. The data 506 includes a data type 701, RW flag 702, address 703, and data 704.

The data type 701 indicates a type of the data 506. The RW flag 702 indicates one of read and write access types to a register. The address 703 indicates an access destination. The data 704 is readout data or data to be written. Note that the address 703 need only be information which can specify a module and a register in that module. Note that setting path start data stored in a setting path start packet (switching data) or connection ID change data stored in a connection ID change packet (to be described later) similarly adopts the format of the data 506.

An overview of processing for switching a data path will be described below. A data path used to transfer, for example, connection ID change data is defined as a first data processing path (that is, a communication route setting path), and a data path used to transfer data to be processed by the data processing units 103 and data used to change register settings of the data processing units 103 is defined as a second data processing path. In this embodiment, when the path identifier 505 of the received packet is "1", the communication unit 102 processes that packet as that of the first data processing path; when the path identifier 505 is "0", the communication unit 102 processes that packet as that of the second data processing path. Note that the data reception unit 201 ignores the values of the fields 501 to 504 of a packet of the first data processing path, and always fetches data in the field 506. In addition, the communication unit 102 connected to the data processing unit 103 stores a packet in the buffer 202 without invalidating it, and transfers that packet to the next module in the next cycle.

That is, the first data processing path is a path in which a packet input from the data input/output unit 101 makes a round on the ring path, and is output to the data input/output unit 101 again. On the other hand, the second data processing path is decided by register settings of the communication units 102.

Upon switching from the first data processing path to the second data processing path, data which writes "0" in the path setting unit 405 of the communication unit 102 connected to the data input/output unit 101 is input from the input terminal 151 to follow data to be transferred by the first data processing path. Since this value is reflected in the next clock cycle, this data itself is transferred by the first data processing path, and the next and subsequent input data are transferred by the second data processing path.

On the other hand, upon switching from the second data processing path to the first data processing path, data which writes "1" in the path setting unit 405 of the communication unit 102 connected to the data input/output unit 101 is input from the input terminal 151 to follow data to be transferred by the second data processing path. Since this value is reflected in the next clock cycle, this data itself is transferred by the second data processing path, and the next and subsequent input data are transferred by the first data processing path.

Data following the data which writes "1" in the path setting unit 405 controls the output control unit 403 to block an output to the packet generation unit 404 until the data processing completion detection unit 406 detects completion of processing of the second data processing path.

In this way, even when the data path goes round, since data processing by the first data processing path does not start, the data path setting in the preceding second data processing path can be prevented from being changed, or the order can be prevented from being replaced due to overtaking of transfer data. When the first data processing path is switched to the second data processing path as well, an output to the packet generation unit 404 may be similarly blocked. However, such blocking is not required since transfer data of the first data processing path, which makes only one round on the ring bus, is never overtaken.

Data processing in the data processing apparatus 10 according to the present invention will be described below. Assume that each data processing unit 103 is a circuit configurable even for each module using parameters like, for example, a filter circuit. Furthermore, by changing the module use order by the communication units 102, flexible processing is implemented. Since the communication units 102 can arbitrarily change the use order of a plurality of modules, complicated data processing including branches of a data path can also be implemented. Since a complicated data path includes data transfer overlapping periods between two or more logical modules on the ring bus, the transfer efficiency on the ring bus largely influences the processing efficiency of the overall apparatus.

Since an output result of data to be processed by each data processing unit 103 may be changed unless that data is processed in a predetermined order, it is required to be set to transfer data in the predetermined order. On the other hand, an output result of data, which is not influenced by the transfer order like data used to read/write a register or memory of each module, is transferred by a data path having high transfer efficiency of the ring bus.

Figure 5A:
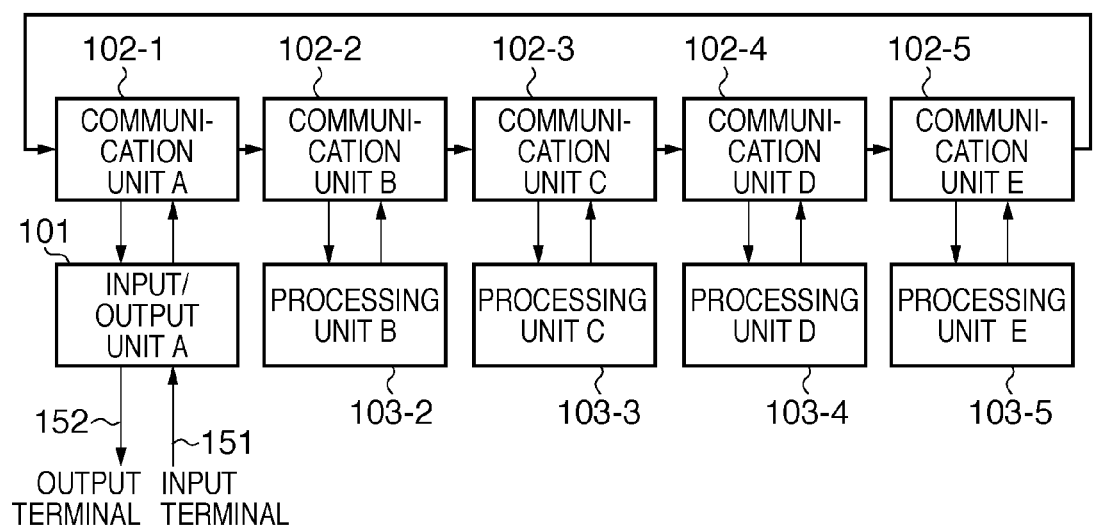
FIG. 5A is a schematic block diagram showing the arrangement of the data processing apparatus 10.

Use of the second data processing path will be explained below taking the data processing apparatus shown in FIG. 5A as an example. Five communication units, that is, a communication unit A (communication unit 102-1) to communication unit E (communication unit 102-5) are used. The communication unit A (communication unit 102-1) corresponds to a data input/output unit A (data input/output unit 101). The communication unit B (communication unit 102-2) to communication unit E (communication unit 102-5) respectively correspond to a data processing unit B (data processing unit 103-2) to data processing unit E (data processing unit 103-5).

Figure 5B:
FIG. 5B is a view showing a use order of modules.
Figure 5C:
FIG. 5C is a view showing a use order of modules.

FIGS. 5B and 5C represent use orders of modules. A data processing order is A (input)→D→B→A (output), as shown in FIG. 5B. The actual connection order of modules is replaced, and a data path makes two rounds on the ring bus.

Figure 6A:
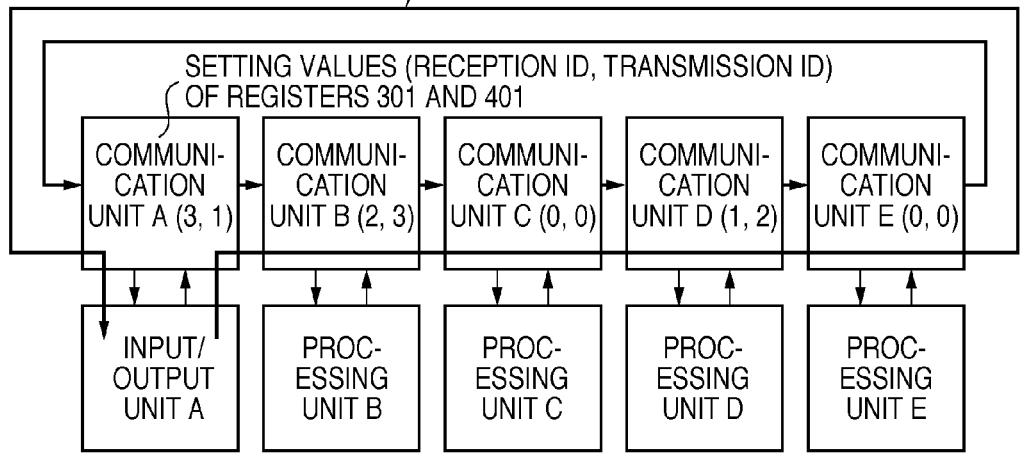
FIG. 6A is a diagram showing a first data processing path.
Figure 6B:
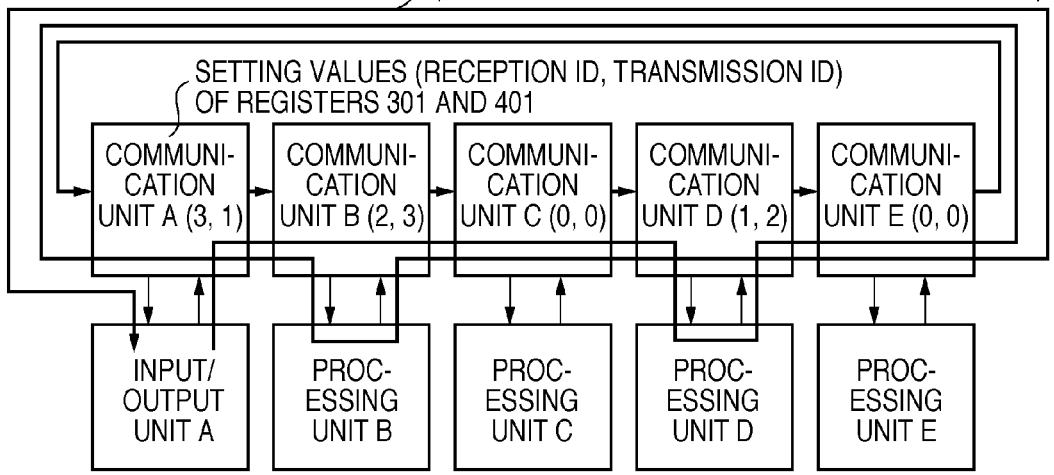
FIG. 6B is a diagram showing a second data processing path upon transferring data to be processed.
Figure 6C:
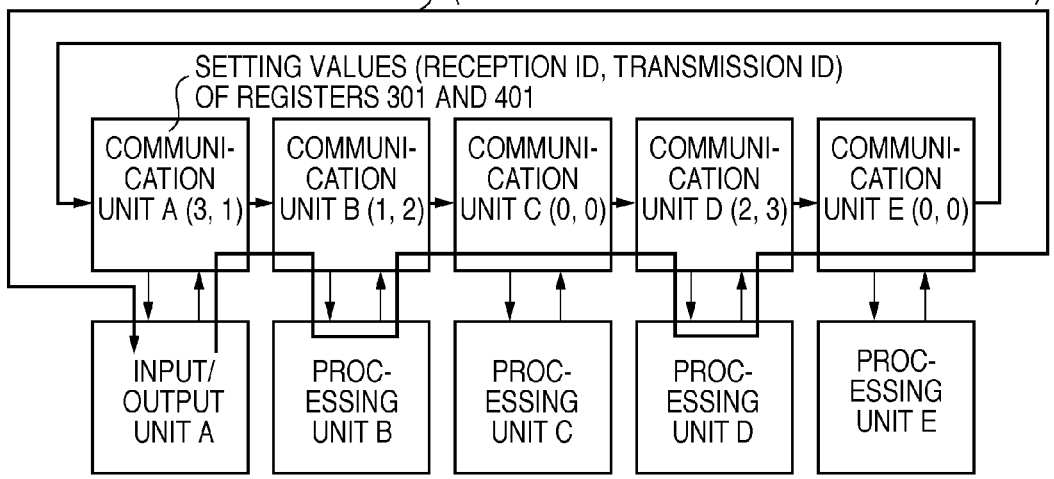
FIG. 6C is a diagram showing the second data processing path upon transferring module setting data.

By contrast, processing unit setting data, which does not depend on the transfer order between modules, as described above, may use modules in an order which makes only one round on the ring bus, as shown in FIG. 5C. This order is A (input)→B→D→A (output). That is, the processing order shown in FIG. 5B is attained by a connection instruction which makes two rounds on the ring, as shown in FIG. 6B (to be described later). On the other hand, the processing order shown in FIG. 5C can be attained by a connection instruction which makes only one round on the ring, as shown in FIG. 6C (to be described later).

These paths are set in the aforementioned first data processing path, and are executed in the second data processing path. Both the paths belong to the second data processing path, but they can be switched by appropriately setting the reception ID registers 301 and transmission ID registers 401 shown in FIGS. 3A and 3B.

This switching is executed by setting individual transmission IDs and reception IDs in the data processing apparatus. Such settings may be executed using, for example, the CPU 21. The processing sequence executed when the CPU 21 expands connection ID change data or data to be processed according to processing to be executed by the data processing unit 40 on the RAM 23, and executes the data processing will be described below with reference to FIG. 7.

In step S701, the CPU 21 expands processing data of the data processing apparatus on the RAM 23. In step S702, the CPU 21 transmits a processing start signal to the data processing unit 40.

In step S703, the CPU 21 stands by until processing in the data processing unit 40 is complete. The CPU 21 determines in step S704 whether or not completion of processing in the data processing unit 40 is detected. If it is determined that completion of processing is detected, the processing ends. On the other hand, if it is not determined that completion of processing is detected, the process returns to step S704.

Note that completion of processing is detected by a notification to the CPU 21 such as an interrupt.

Data to be expanded in step S701 will be described below with reference to FIG. 8. The data to be expanded in step S701 represents data on the memory which is expanded at a memory address of a location appended to the processing start address or at a predetermined address.

Upon loading this data, the data processing apparatus processes data according to a data storage order, and can start image processing as soon as the end of the processing. A.recv_id represents the reception ID register 301 of the module A. A.send_id represents the transmission ID register 401 of the module A. procA.reg1 represents a register of the input/output unit A.

Figure 1B:
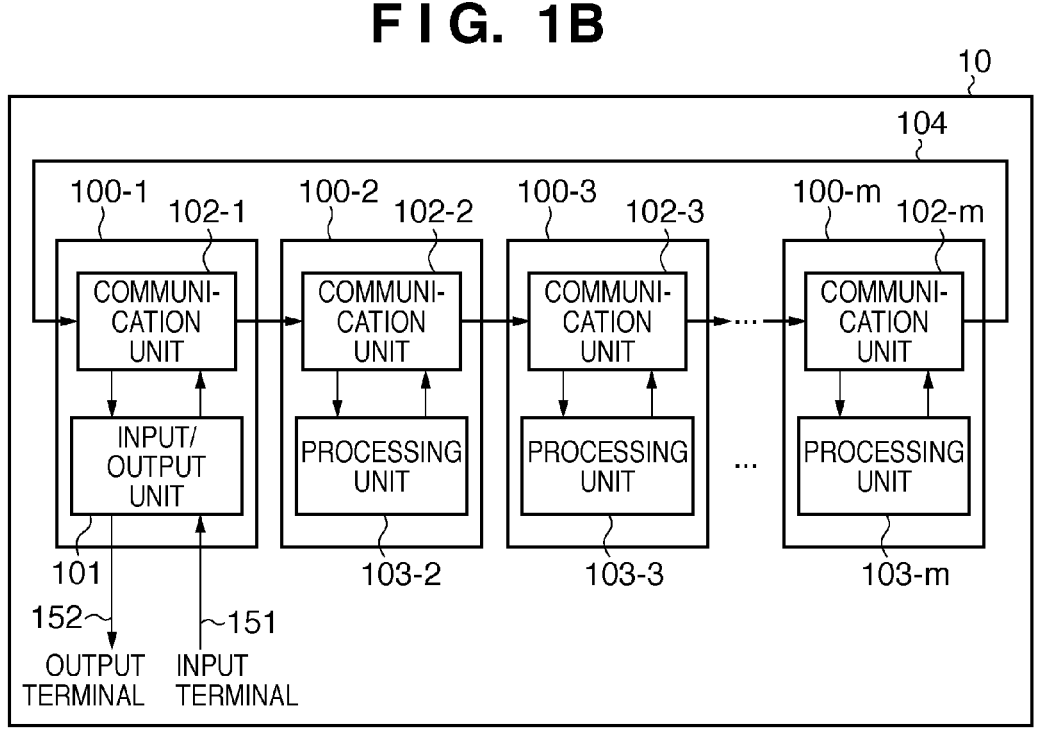
FIG. 1B is a schematic block diagram showing the arrangement of the data processing apparatus 10.
Figure 8:
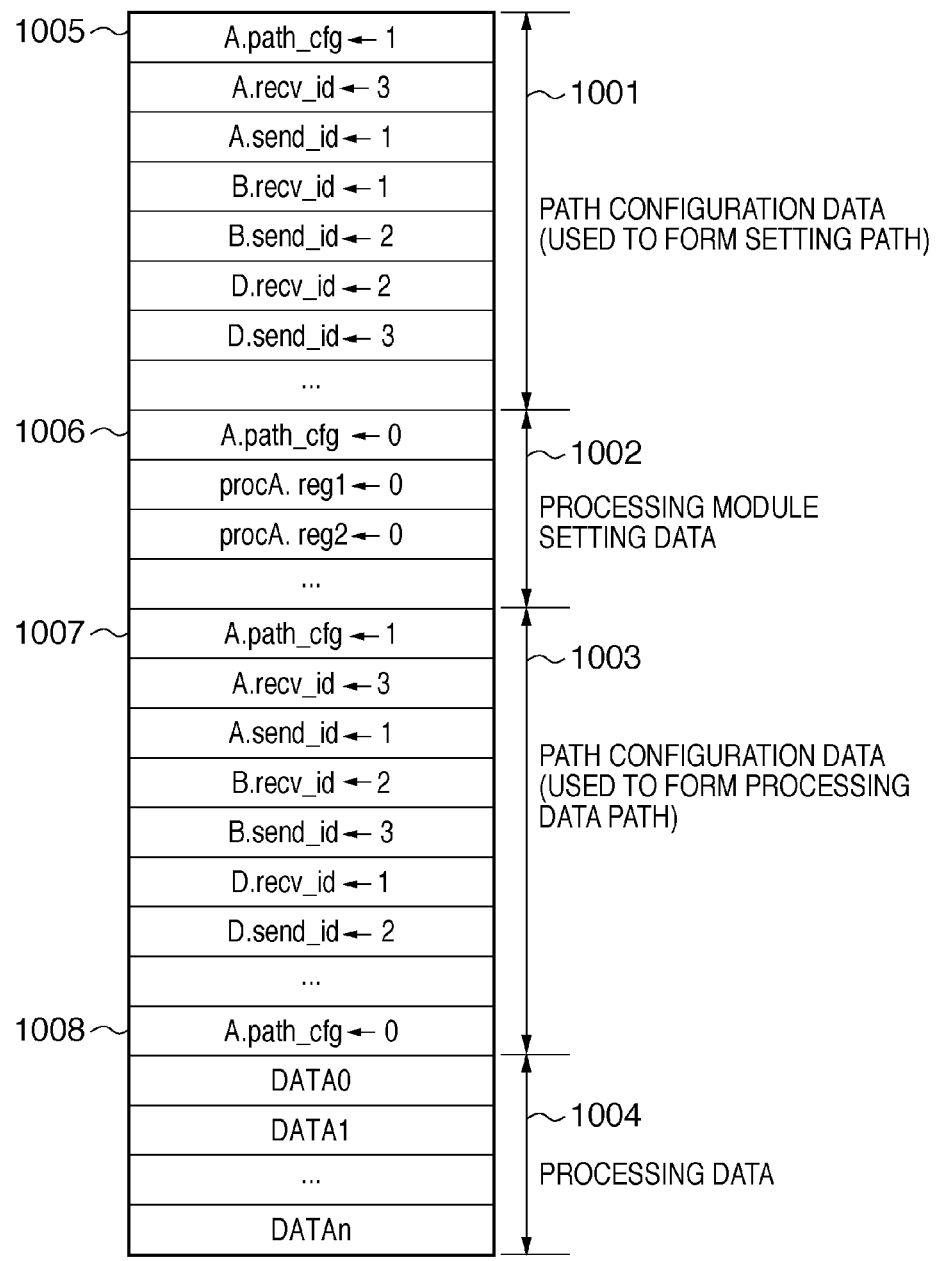
FIG. 8 is a view showing an example of a command sequence used to set paths used to transfer setting commands and to execute data processing.

Upon reception of the processing start signal in step S702, the data processing unit 40 in FIG. 1A reads out data in turn from the top data downward in the data configuration shown in FIG. 8, and outputs them to the input terminal 151. A processing result is written out to a predetermined address of the RAM 23.

Data A.path_cfg←1 1005 represents data which writes "1" in path_cfg (path setting unit 405) of the module A. When this packet sets "1" in the path setting unit 405, all subsequently flowing packets are transferred in a route which passes through the first data processing path shown in FIG. 6A, and makes only one round via only the communication units 102. Subsequent path configuration data 1001 (for processing module settings) are transferred by the first data processing path shown in FIG. 6A, and set reception IDs and transmission IDs to form a path shown in FIG. 5C.

Subsequently, when data A.path_cfg←0 1006 is transferred, "0" is set in the path setting unit 405. Packets which follow this data control the communication units 102 which are set in advance to receive the packets to transfer the received packets to the data processing units 103, as shown in FIG. 6C. Since the processing order in this case is that shown in FIG. 5C, setting packets are output after they make one round on the ring.

After that, processing module setting data 1002 are transferred by the second data processing path (upon transferring module setting data), as shown in FIG. 6B, and set the modules B and D.

Next, after the data processing path is switched to the first data processing path shown in FIG. 6A again by data A.path_cfg←1 1007, path configuration data 1003 set reception IDs and transmission IDs of the communication units 102 to specify the processing order shown in FIG. 5B. After that, by transferring data A.path_cfg←0 1008, settings to flow data, as shown in FIG. 6B, are complete.

Subsequently, processing data 1004 are transferred by the second data processing path (upon transferring data to be processed), as shown in FIG. 6B, and undergo data processing by the respective data processing units 103.

The path configuration data 1001 and 1003 are input to transfer data for setting the second data processing path by the first data processing path by switching values of the path setting unit 405 in the first data 1005 and last data 1006.

When whole data to be processed is not input at once but is divided into some units to execute data processing, the processing data 1004 may be replaced and may be repetitively output to the input terminal 151. At this time, when no setting change is required, only the processing data 1004 may be input in the second and subsequent input operations.

When the settings of the processing modules are to be changed for each unit of data to be processed, the processing module setting data 1002 are replaced and executed in correspondence with the unit of processing data. When all data cannot be expanded onto the RAM 23 at once, data shown in FIG. 8 may be divisionally input. Note that all or some of input data may be acquired from the ROM 22.

In this manner, data which implement desired data processing are input. The second data processing path (upon transferring data to be processed) shown in FIG. 6B makes two rounds on the ring bus. If the processing module setting data 1002 are transferred intact, already processed data go round. When data is input to a target module but reception conditions are not satisfied, that data goes round until the reception conditions are satisfied. That is, a situation in which data wastefully occupy the ring bus may occur. However, by transferring data by the second data processing path (upon transferring module setting data) shown in FIG. 6C in the sequence of the present invention, such situation can be avoided. When data to be processed is, for example, image data, and parameters of the data processing units 103 are to be changed in correspondence with each certain region of an image, processes in the first and second data processing paths can be repeated.

Note that the following configuration may be adopted. That is, the first data processing path is set in advance by setting, in each communication module in a physical connection order, a first reception ID number indicating a source communication module from which data is to be received and a first transmission ID number indicating a destination communication module to which data is to be transmitted. The second data processing path is set in advance by setting, in each communication module, a second reception ID number indicating a source communication module from which data is to be received and a second transmission ID number indicating a destination communication module to which data is to be transmitted. Then, the first and second data processing paths are switched by selecting the first or second data processing path.

Second Embodiment

Figure 10A:
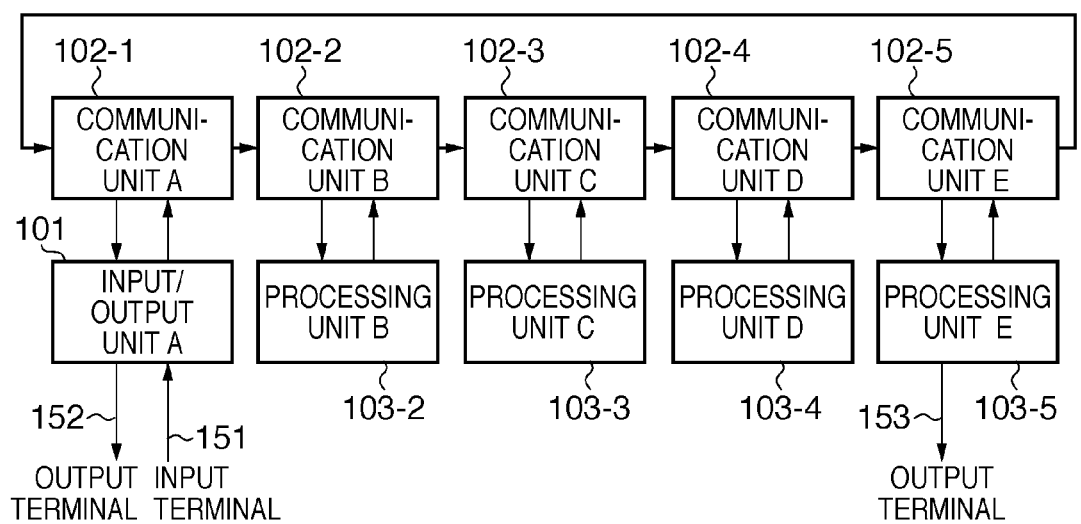
FIG. 10A is a schematic block diagram showing the arrangement of a data processing apparatus.

A schematic arrangement of a data processing apparatus according to this embodiment will be described below with reference to FIG. 10A. The data processing unit E (data processing unit 103-5) of the data processing apparatus described using FIG. 5A is replaced by an output unit 1101 (output unit E). To the output unit E, an output terminal 153 is connected. The flow of processes when a data path is branched will be described below with reference to FIG. 10B. Data input from a module A is processed by a processing unit D, and then undergoes different processes by two processing units B and C. After that, the output from the processing unit B is output from an input/output unit A. On the other hand, the output from the processing unit C is output from the output unit E.

At this time, a case will be examined below wherein results of the processes are required to be read out from the processing units B and C, respectively. In case of the processing path in this state, when data required to read out data held in the processing unit B is expanded and is input from an input/output unit A, that data is packetized by a communication unit A, and flows while being branched to the processing units B and C after the processing unit D. In this case, since data held in the packet reads out data of the processing unit B, readout data of the processing unit B is output from the input/output unit A which outputs data from the processing unit B. At this time, since the output unit E outputs the packet input from the input/output unit A without going through the processing unit B, that output data is wasted.

On the other hand, in order to output readout data of the processing unit C, data required to read out data held in the processing unit C has to be expanded and be input from the input/output unit A again. In this case, the output unit E outputs readout data of the processing unit C, while the input/output unit A outputs the input data intact without going through the processing unit C.

Figure 10B:
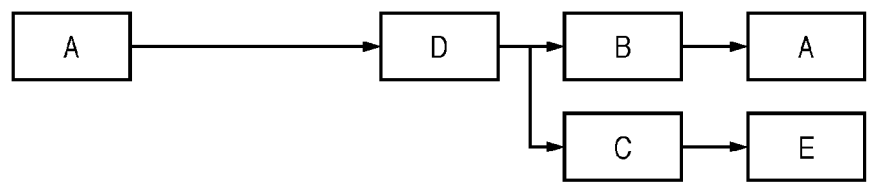
FIG. 10B is a view showing a use order of modules when a data patch branches.

When module setting and read processes after branches are to be executed using a second data processing path including the branches shown in FIG. 10B, two independent activations are required.

If the read processes are executed by a single activation, a read-out data sequence of the processing unit B and that of the processing unit C are successively expanded as data to be input, and are input from the input/output unit A. As a result, the input/output unit A outputs data read out from the processing unit B and the read-out data of the processing unit C, which remains unchanged, and the output unit E outputs the read-out data of the processing unit B, which remains unchanged, and data read out from the processing unit C. At this time, of the output data of both the units, data which remain unchanged waste output memory areas, resulting in poor efficiency.

Figure 11:
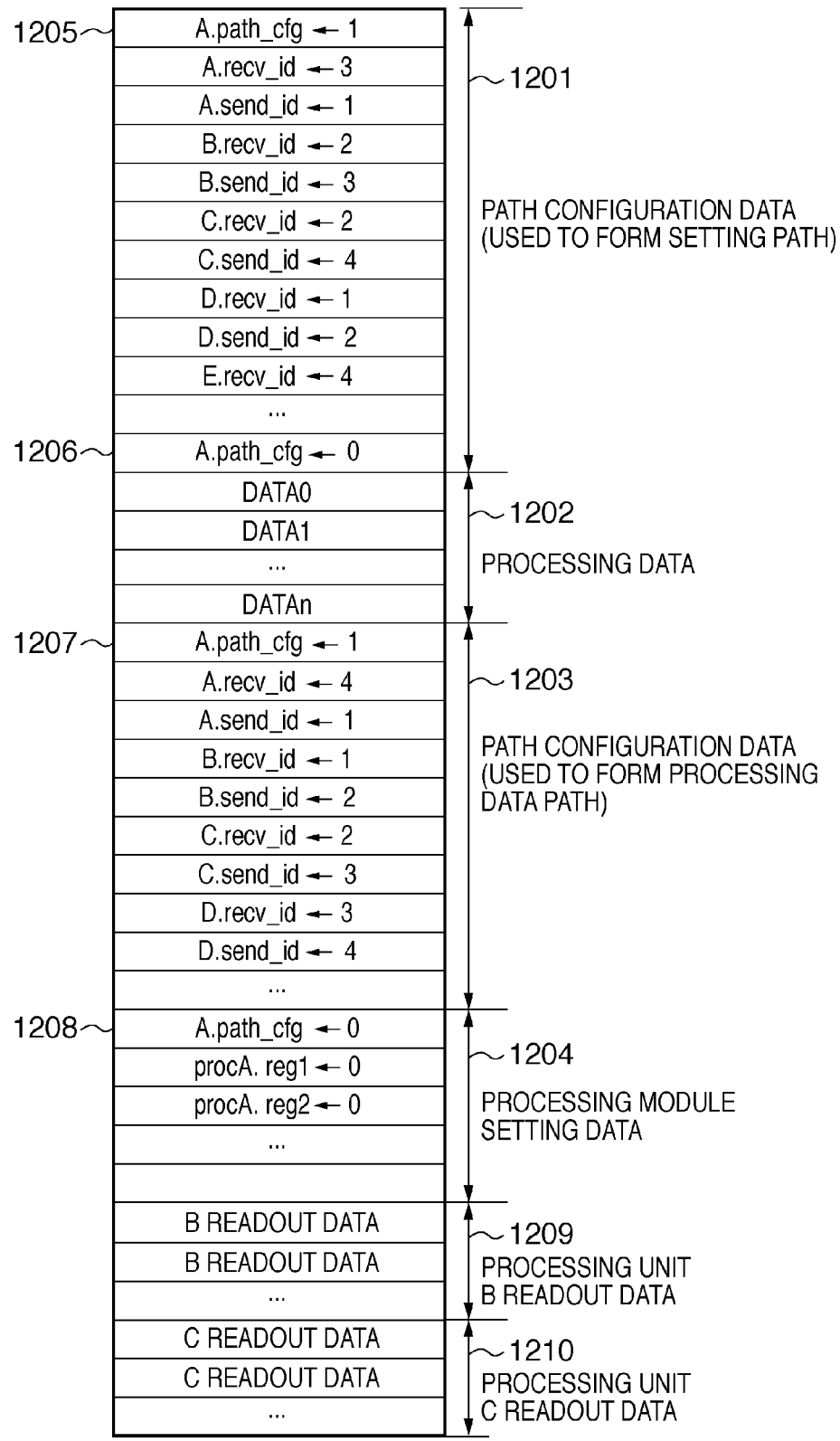
FIG. 11 is a view showing an example of expanded data.

Expanded data required for processes in this case will be exemplified below with reference to FIG. 11. After transition to a first data processing path by data A.path_cfg←-1 1205, path configuration data 1203 make settings to form the branched flow shown in FIG. 10B. In this case, since "2" as a transmission ID of the processing unit D is set in B.recv_id of the processing unit B and C.recv_id of the processing unit C, both the processing units B and C are set to wait for the output of the processing unit D.

When such branched flow is formed, the data processing path transits to the second data processing path by data A.path_cfg←0 1206 to transfer data and to execute processes.

Figure 10C:
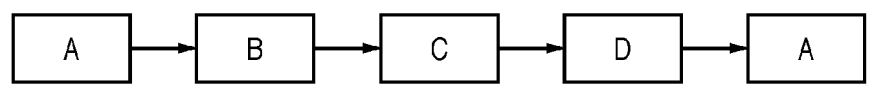
FIG. 10C is a view showing a use order of modules.

After that, in order to read out data stored in the processing units B and C by the data processes, the data processing path transits to the first data processing path again by data A.path_cfg←-1 1207. Then, processing module setting data 1204 set a processing order shown in FIG. 10C. After that, the data processing path transits to the second data processing path again by data A.path_cfg←0 1208. Then, by transferring processing unit B read-out data 1209 and processing unit C read-out data 1210 according to the processing module setting data 1204, data are read out.

In this manner, readout data of the processing units B and C can be efficiently read out by a single activation without wasting any holding area.

Third Embodiment

Figure 12A:
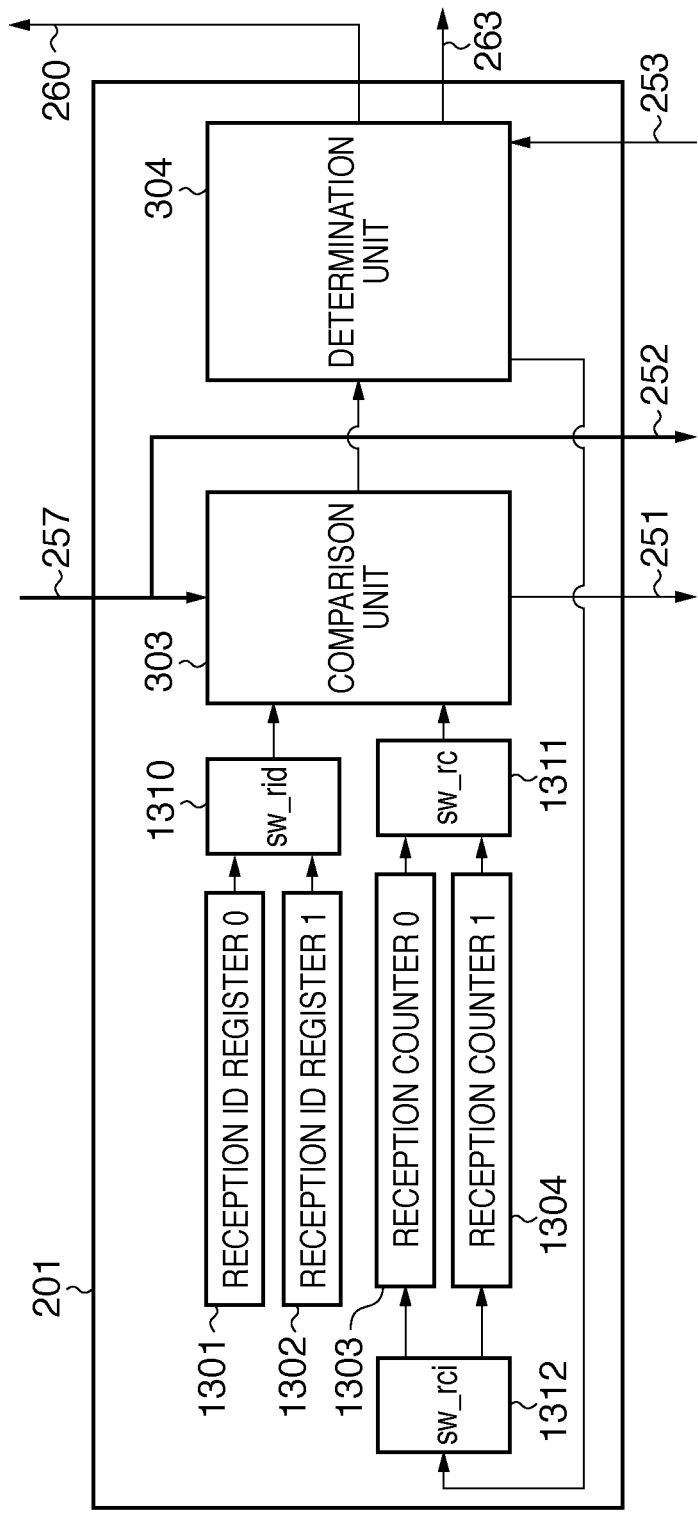
FIG. 12A is a schematic block diagram showing the arrangement of a data reception unit 201.
Figure 12B:
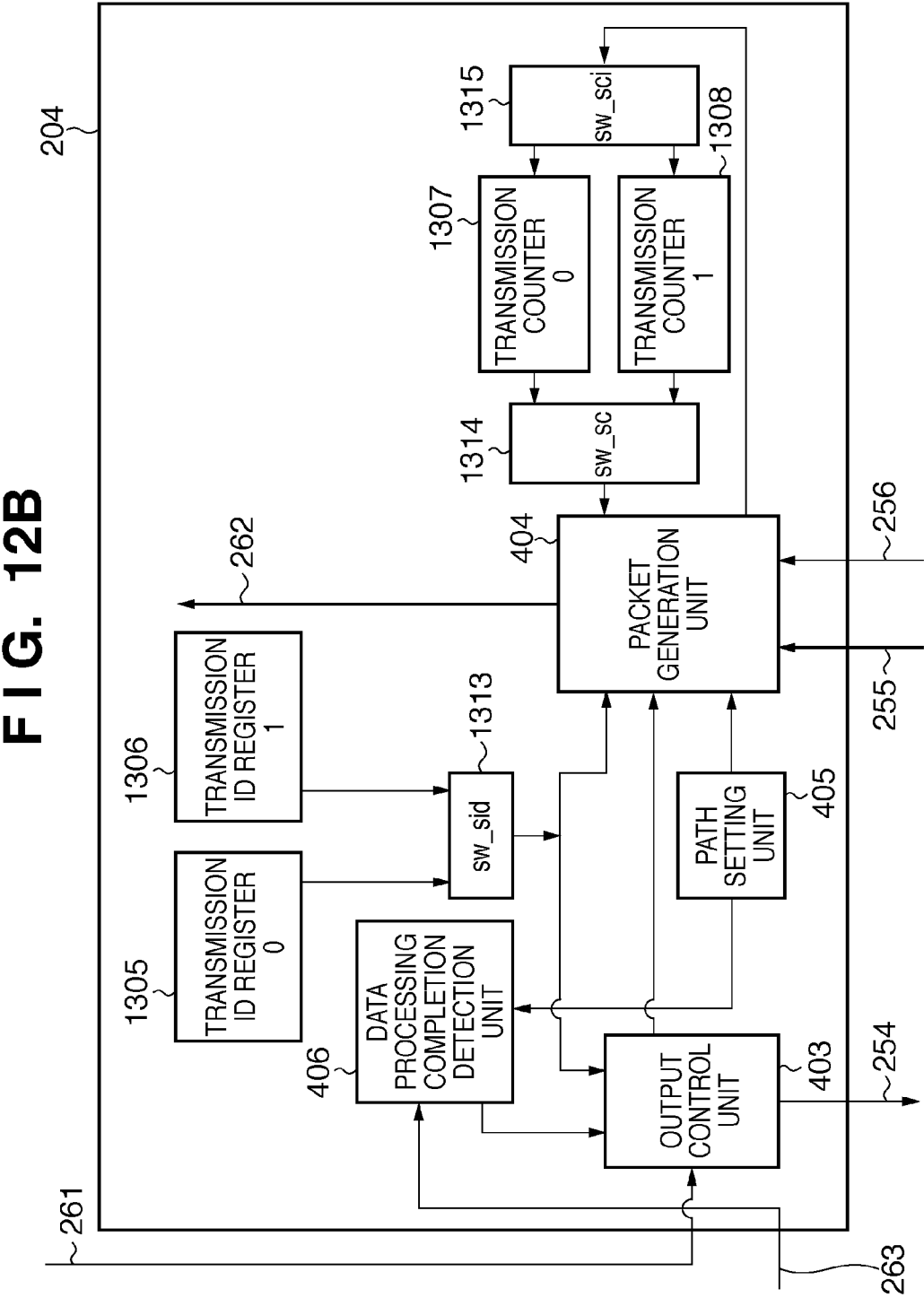
FIG. 12B is a schematic block diagram showing the arrangement of a data transmission unit 204.

A data processing apparatus according to the third embodiment includes two sets of register groups required to set a second data processing path unlike in the first embodiment which includes one register group set. The register group used to set the second data processing path includes a set of a reception ID register 301, reception counter 302, transmission ID register 401, and transmission counter 402. Packet reception and transmission operations will be described below with reference to FIG. 12A which shows a data reception unit 201 according to this embodiment and FIG. 12B which shows a data transmission unit 204 according to this embodiment. Note that the data processing apparatus has the same arrangement as that of the data processing apparatus described in the first embodiment. The operations are the same as those of the first embodiment except for selection of two sets of register groups required to set the second data processing path, and a description thereof will not be repeated.

<Arrangement of Data Reception Unit 201>

A value held in a reception ID register 1301 (reception ID register 0) is used to be compared with a connection ID 504 of a packet when a data type 701 of data 506 held by the packet indicates a format shown in FIG. 4B.

A value held in a reception ID register 1302 (reception ID register 1) is used to be compared with the connection ID 504 of a packet when the data type 701 of the data 506 held by the packet indicates a format shown in FIG. 4C.

A value held in a reception counter 1303 (reception counter 0) is used to be compared with a count value 503 of a packet when the data type 701 of the data 506 held by the packet indicates the format shown in FIG. 4B.

A value held in a reception counter 1304 (reception counter 1) is used to be compared with the count value 503 of a packet when the data type 701 of the data 506 held by the packet indicates the format shown in FIG. 4C.

Switches 1310, 1311, and 1312 switch the reception ID register and reception counter to be used, and the reception counter to be incremented in the next cycle to have, as an input, the value of the data type 701 of the data 506 held by a packet via signal lines (not shown).

<Arrangement of Data Transmission Unit 204>

A value held in a transmission ID register 1305 (transmission ID register 0) is appended as a connection ID 504 of a packet by a packet generation unit 404 when a data type 701 of an input signal 255 (the format is represented by the data 506) from a data processing unit 103 and data input/output unit 101 indicates the format shown in FIG. 4B.

A value held in a transmission ID register 1306 (transmission ID register 1) is appended as a connection ID 504 of a packet by the packet generation unit 404 when the data type 701 of the input signal 255 (the format is represented by the data 506) from the data processing unit 103 and data input/output unit 101 indicates the format shown in FIG. 4C.

A value held in a reception counter 1307 (reception counter 0) is appended as a count value 503 of a packet by the packet generation unit 404 when the data type 701 of the input signal 255 (the format is represented by the data 506) from the data processing unit 103 and data input/output unit 101 indicates the format shown in FIG. 4B.

A value held in a reception counter 1308 (reception counter 1) is appended as the count value 503 of a packet by the packet generation unit 404 when the data type 701 of the input signal 255 (the format is represented by the data 506) from the data processing unit 103 and data input/output unit 101 indicates the format shown in FIG. 4C.

Switches 1313, 1314, and 1315 switch the transmission ID register and transmission counter to be used, and the transmission counter to be incremented in the next cycle to have, as an input, the value of the data type 701 of the input signal 255 (the format is represented by the data 506) from the data processing unit 103 and data input/output unit 101 via signal lines (not shown).

Figure 9:
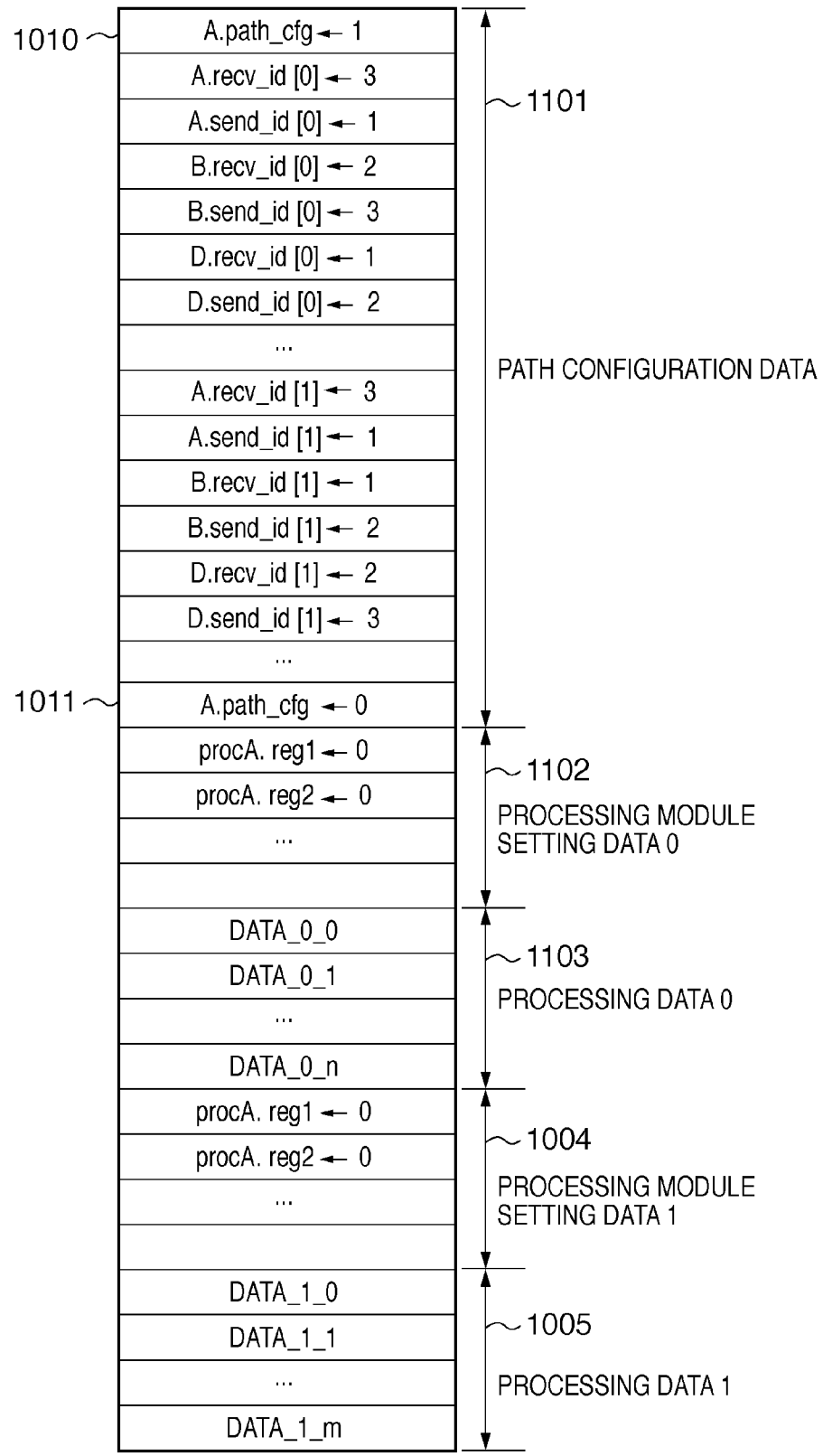
FIG. 9 is a view showing an example of a command sequence used to make two different ID register settings.

Since the two sets of register groups are included, a transfer path is decided by the types of data to be transmitted/received, and path settings are not required to be switched according to data sequences to be processed. For this reason, processing data can be input so as to set data paths at once, as shown in FIG. 9. In FIG. 9, suffices [0] and [1] of, for example, A.recv_id[0] and A.recv_id[1] in FIG. 9 respectively indicate the register groups corresponding to data shown in FIGS. 4B and 4C.

By inputting data shown in FIG. 9, path configuration data can be input once in a series of data processes.

According to the present invention, data paths according to types of data to be transferred to modules can be formed, thus improving processing efficiency.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146889 filed on Jun. 28, 2010, which is hereby incorporated by reference herein in its entirety.

What is claimed is:

1. A data processing apparatus, which circulates data in one direction between a plurality of communication interfaces connected in a ring shape, said apparatus comprising:
at least one input/output interface connected to at least one of the plurality of communication interfaces, which inputs/outputs data to/from the connected communication interface;
a plurality of circuits respectively connected to a plurality of communication interfaces other than the communication interface connected to said input/output interface, which process data input from the connected communication interfaces and output the processed data to the connected communication interfaces;
a path setting circuit that sets a parameter regarding a path representing whether data input from said input/output interface is data to be processed by said plurality of circuits based on a parameter indicating a processing order set by a controller; and
a switching processor that switches between a first data processing path and a second data processing path, based on the parameter regarding the path set by said path setting circuit, wherein
the first data processing path transfers the data in an order in which the plurality of communication interfaces are physically connected,
the second data processing path transfers the data in a set logical connecting order other than the order in which the plurality of communication interfaces are physically connected, and
said switching processor switches to the first data processing path in a case where the parameter regarding the path represents that the data input from said input/output interface is not data to be processed by said plurality of circuits in the processing order, and said switching processor switches to the second data processing path in a case where the parameter regarding the path represents that the data input from said input/output interface is data to be processed by said plurality of circuits in the processing order.

2. The apparatus according to claim 1, wherein the controller sets, in each communication interface, a reception ID number indicating a source communication interface from which the data is received and a transmission ID number indicating a destination communication to which the data is transmitted, and
said switching processor switches between the first data processing path and the second data processing path by changing an order specified by the reception ID numbers and the transmission ID numbers set by the controller.

3. The apparatus according to claim 1, wherein the controller sets in advance the first data processing path by setting a first reception ID number indicating a source communication interface from which the data is received and a first transmission ID number indicating a destination communication interface to which the data is transmitted in each communication interface in the physically connected order,
the controller sets in advance the second data processing path by setting, in each communication interface, a second reception ID number indicating a source communication interface from which the data is received and a second transmission ID number indicating a destination communication interface to which the data is transmitted, and
said switching processor switches between the first data processing path and the second data processing path by selecting one of the first data processing path and the second data processing path.

4. A data processing method in a data processing apparatus, which circulates data in one direction between a plurality of communication interfaces connected in a ring shape, and which comprises at least one input/output interface adapted to be connected to at least one of the plurality of communication interfaces, and input/output data to/from the connected communication interface, and a plurality of circuits adapted to be respectively connected to a plurality of communication interfaces other than the communication interface connected to the input/output interface, process data input from the connected communication interfaces, and output the processed data to the connected communication interfaces, the method comprising:

setting a parameter regarding a path representing whether data input from the input/output interface is data to be processed by the plurality of circuits based on a parameter indicating a processing order; and switching between a first data processing path and a second data processing path, based on the set parameter regarding the path, wherein the first data processing path is a data path for transferring the data in an order in which the plurality of communication interfaces are physically connected, wherein the second data processing path is a data path for transferring the data not in an order in which the plurality of communication interfaces are physically connected but in a set logical connecting order, and wherein said switching includes switching to the first data processing path in a case where the parameter regarding the path represents that the data input from said input/output interface is not data to be processed by said plurality of circuits in the processing order, and switching to the second data processing path in a case where the parameter regarding the path represents that the data input from said input/output interface is data to be processed by said plurality of circuits in the processing order.

5. A non-transitory computer-readable storage medium storing a computer program for controlling a computer to execute respective steps of a data processing method according to claim 4.

6. The apparatus according to claim 1, wherein the communication interface blocks transferring data following the data in which the parameter regarding the path represents that the data input from said input/output interface is not data to be processed by said plurality of circuits in the processing order, until the processing of the second data processing path is completed.

7. The method according to claim 4, further comprising:
setting, in each communication interface, a reception ID number indicating a source communication interface from which the data is received and a transmission ID number indicating a destination communication interface to which the data is transmitted, and wherein said switching includes switching between the first data processing path and the second data processing path by changing an order specified by the reception ID numbers and the set transmission ID numbers.

8. The method according to claim 4, further comprising:
setting in advance the first data processing path by setting a first reception ID number indicating a source communication interface from which the data is received and a first transmission ID number indicating a destination communication interface to which the data is transmitted in each communication interface in the physically connected order, and setting in advance the second data processing path by setting, in each communication interface, a second reception ID number indicating a source communication interface from which the data is received and a second transmission ID number indicating a destination communication interface to which the data is transmitted, and wherein said switching includes switching between the first data processing path and the second data processing path by selecting one of the first data processing path and the second data processing path.

9. The method according to claim 4, further comprising:
causing the communication interface to block transferring data following the data in which the parameter regarding the path represents that the data input from said input/output interface is not data to be processed by said plurality of circuits in the processing order, until the processing of the second data processing path is completed.

10. An apparatus comprising:
a plurality of interfaces connected with each other, which processes a packet that can hold data to be processed and be set identification information and a parameter representing a first data processing path or a second data processing path, each of the plurality of interfaces comprising:

a memory device that stores connection information;
a receiver that receives the packet;
a determination circuit that determines whether the parameter of the received packet represents data of the first data processing path or data of the second data processing path and determines whether the identification information of the received packet coincides with the connection information stored in said memory device;
a processor that processes data included in the received packet; and
a transmitter that transmits the received packet or a packet having the processed data, wherein the first data processing path is a data path for transferring the data in an order in which the plurality of interfaces are physically connected, the second data processing path is a data path for transferring the data in a set logical connecting order which is different from the order in which the plurality of interfaces are physically connected, the receiver transmits the received data to said processor and said processor processes the received data when the connection information of the received data coincides with the connection information stored in said memory device, and the receiver transmits the received data to said transmitter without transmitting the received data to said processor when the connection information of the received data does not coincide with the connection information stored in said memory device, in a case where it is determined by said determination circuit that the parameter of the received packet represents data of the second data processing path, and said receiver transmits the received data to said transmitter without transmitting the received data to said processor in a case where it is determined by said determination circuit that the parameter of the received packet represents data of the first data processing path.

11. The apparatus according to claim 10, wherein said interfaces process the received packet regardless of a value of the connection information of the received data, in a case where it is determined by said determination circuit that the received data represents data of the first data processing path.

12. A method for controlling an apparatus having a plurality of interfaces connected with each other, which processes a packet that can hold a data to be processed and be set identification information and a parameter representing a first data processing path or a second data processing path, the method of each of the plurality of interfaces comprising:

storing connection information into a memory device;
receiving the packet by a receiver;
determining by a determination circuit whether the parameter of the received packet represents data of the first data processing path or data of the second data processing path and determining whether the identification information of the receiving packet coincides with the connection information in said memory device;

processing data included in the received packet by a processor;

transmitting the received packet or a packet having the processed data by a transmitter, wherein the first data processing path is a data path for transferring the data in an order in which the plurality of interfaces are physically connected, the second data processing path is a data path for transferring the data in a set logical connecting order which is different from the order in which the plurality of interfaces are physically connected, the received data is transmitted by the receiver to said processor and is processed when the connection information of the received data coincides with the connection information stored in said memory device, and the receiver transmits the received data to said transmitter without transmitting the received data to said processor when the connection information of the received data does not coincide with the connection information stored in said memory device, in a case where it is determined in said determining step that the parameter of the received packet represents data of the second data processing path, and the received data is transmitted by the receiver to said transmitter without transmitting the received data to said processor in a case where it is determined in said determining step that the parameter of the received packet represents data of the first data processing path.

13. The method according to claim 12, wherein the received packet is processed regardless of a value of the connection information of the received data, in a case where it is determined in said determining step that the received data represents data of the first data processing path.

14. A data processing apparatus, which circulates data in one direction between a plurality of communication interfaces connected in a ring shape, said apparatus comprising:

at least one input/output interface connected to at least one of the plurality of communication interfaces, and input/output data to/from the connected communication interface; and a plurality of processors respectively connected to a plurality of communication interfaces other than the communication interface connected to said input/output interface, process data received from the connected communication interfaces, and output the processed data to the connected communication interfaces;

each of the communication interfaces comprises a setting circuit which sets a first mode in which received data is transferred to a subsequent communication interface without outputting the received data to a corresponding processor or a second mode in which received data is outputted to a subsequent communication interface or a corresponding processor, said data processing apparatus further comprising a control circuit which sets the plurality of processors so as to become a setting processing order to set processors used for the data processing, in the first mode set by said setting circuit; sets processors used for the data processing in the setting processing order in the second mode set by said setting circuit; and then sets the plurality of communication interfaces based on a logical order in the first mode set by said setting circuit; in a case where data processing is started in which data input by said input/output interface is processed in the logical order by at least two processors out of the plurality of processors, wherein the control circuit inputs, to said input/output interface, switching data having a parameter regarding the first mode or second mode, the setting processing order is an order in which data is retrieved in a physically connected order by processors used for the data processing, the logical order is an order in which data is retrieved in an order which is different from the physically connected order, and the setting circuit sets the first mode or the second mode based on the switching data representing the first mode or the second mode.

15. The apparatus according to claim 14, wherein each of the communication interfaces further comprises an output control circuit which controls data to be outputted, and wherein said output control circuit in a communication interface connected to the input/output interface controls to output data subsequent to the switching data after the processing is completed in the second mode, if the switching data which represents switching from the second mode to the first mode is input from the input/output interface.

16. The apparatus according to claim 14, wherein the communication path of data for setting processors used for the data processing is a path which goes only one round along the plurality of communication interfaces.

17. A control apparatus for controlling data in accordance with processing which is to be executed by a data processing apparatus comprising: an input interface which inputs data; a plurality of processors which processes received data; and a communication interface connected correspondingly to the input interface and each of the processors;

said communication interface receiving a packet including data and transferring the packet to a subsequent communication interface; and said communication interfaces being connected in a ring shape, each of the communication interfaces retrieving data included in a received packet and each of the communication interfaces switching and setting a processing mode in which the data is outputted to a corresponding processor and a setting mode in which said communication interface is set based on data included in a received packet without outputting the data to a corresponding processor, wherein in a case where said control apparatus causes at least two or more processors out of the plurality of processors to perform data processing in a logical order, after said control apparatus inputs switching data for setting the communication interfaces to the setting mode in order to set processors used for the data processing and inputs data for setting each of communication interfaces corresponding to the plurality of communication interfaces such that the processors used for the data processing receive data in a physically connected order, said control apparatus inputs switching data for setting the communication interfaces to the processing mode and inputs data for setting processing in the processors used for the data processing, and then inputs switching data for setting the communication interfaces to the setting mode and inputs data for setting each of communication interfaces corresponding to the plurality of communication interfaces such that the processors used for the data processing receive data in the logical order which is different from the physically connected order.

18. A data processing method in a data processing apparatus, which circulates data in one direction between a plurality of communication interfaces connected in a ring shape, said apparatus comprising: at least one input/output interface connected to at least one of the plurality of communication interfaces, and input/output data to/from the connected communication interface; and a plurality of processors respectively connected to a plurality of communication interfaces other than the communication interface connected to said input/output interface, process data received from the connected communication interfaces, and output the processed data to the connected communication interfaces, the method comprising:

causing a setting circuit in each of the communication interfaces to set a first mode in which received data is transferred to a subsequent communication interface without outputting the received data to a corresponding processor or a second mode in which received data is outputted to a subsequent communication interface or a corresponding processor; and causing a control circuit in said data processing apparatus to set the plurality of processors so as to become a setting processing order to set processors used for the data processing, in the first mode set by said setting circuit; set processors used for the data processing in the setting processing order in the second mode set by said setting circuit; and then set the plurality of communication interfaces based on a logical order in the first mode set by said setting circuit; in a case where data processing is started in which data input by said input/output interface is processed in the logical order by at least two processors out of the plurality of processors, wherein the control circuit inputs, to said input/output interface, switching data having a parameter regarding the first mode or second mode, the setting processing order is an order in which data is retrieved in a physically connected order by processors used for the data processing, the logical order is an order in which data is retrieved in an order which is different from the physically connected order, and the setting circuit sets the first mode or the second mode based on the switching data representing the first mode or the second mode.

19. A data processing method in a data processing apparatus, which circulates data in one direction between a plurality of communication interfaces connected in a ring shape, said apparatus comprising: at least one input/output interface connected to at least one of the plurality of communication interfaces, and input/output data to/from the connected communication interface; and a plurality of processors respectively connected to a plurality of communication interfaces other than the communication interface connected to said input/output interface, process data received from the connected communication interfaces, and output the processed data to the connected communication interfaces, wherein a communication path of data for setting circuits used for the data processing is differentiated from a communication path of data for processing in accordance with a logical order, in a case where data processing is performed in the logical order by at least two circuits out of the plurality of circuits, wherein a processing order for setting processors used for the data processing is an order in which data is retrieved in a physically connected order by processors used for the data processing, and the logical order is an order in which data is retrieved in an order which is different from the physically connected order.

20. A control method in a control apparatus for controlling data in accordance with processing which is to be executed by a data processing apparatus comprising: an input interface which inputs data; a plurality of processors which processes received data; and a communication interface connected correspondingly to the input interface and each of the processors; said communication interface receiving a packet including data and transferring the packet to a subsequent communication interface, said communication interfaces being connected in a ring shape, each of the communication interfaces retrieving data included in a received packet and each of the communication interfaces switching and setting a processing mode in which the data is outputted to a corresponding processor and a setting mode in which said communication interface is set based on data included in a received packet without outputting the data to a corresponding processor, wherein in a case where said control apparatus causes at least two or more processors out of the plurality of processors to perform data processing in a logical order, after said control apparatus inputs switching data for setting the communication interfaces to the setting mode in order to set processors used for the data processing and inputs data for setting each of communication interfaces corresponding to the plurality of communication interfaces such that the processors used for the data processing receive data in a physically connected order, inputting, by said control apparatus, switching data for setting the communication interfaces the processing mode and inputting data for setting processing in the processors used for the data processing is set, and then inputs switching data for setting the communication interfaces to the setting mode and inputs data for setting each of communication interfaces corresponding to the plurality of communication interfaces such that the processors used for the data processing receive data in the logical order which is different from the physically connected order.

21. A data processing apparatus, which circulates data in one direction between a plurality of communication interfaces connected in a ring shape, said apparatus comprising:

at least one input/output interface connected to at least one of the plurality of communication interfaces, which inputs/outputs data to/from the connected communication interface;

a plurality of processors respectively connected to a plurality of communication interfaces other than the communication interface connected to said input/output interface, which process data input from the connected communication interfaces and output the processed data to the connected communication interfaces;

a path setting circuit that sets a parameter regarding a path representing whether data input from said input/output interface is data to be processed by said plurality of processors based on a parameter indicating a processing order set by a controller; and a switching processor that switches between a first data processing path and a second data processing path, based on the parameter regarding the path set by said path setting circuit, wherein the first data processing path transfers the data in an order in which the plurality of communication interfaces are physically connected, the second data processing path transfers the data in a set logical connecting order other than the order in which the plurality of communication interfaces are physically connected, and said switching processor switches to the first data processing path in a case where the parameter regarding the path represents that the data input from said input/output interface is not data to be processed by said plurality of processors in the processing order, and said switching processor switches to the second data processing path in a case where the parameter regarding the path represents that the data input from said input/output interface is data to be processed by said plurality of processors in the processing order.

* * * * *